United States Patent
Lai

(10) Patent No.: US 12,011,126 B2
(45) Date of Patent: Jun. 18, 2024

(54) METHOD AND SYSTEM FOR PATH SWEEPING OF CLEANING ROBOT, AND CHIP

(71) Applicant: AMICRO SEMICONDUCTOR CO., LTD., Guangdong (CN)

(72) Inventor: Qinwei Lai, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 670 days.

(21) Appl. No.: 17/290,241

(22) PCT Filed: Jan. 22, 2019

(86) PCT No.: PCT/CN2018/122191
§ 371 (c)(1),
(2) Date: Apr. 29, 2021

(87) PCT Pub. No.: WO2020/087699
PCT Pub. Date: May 7, 2020

(65) Prior Publication Data
US 2022/0015598 A1    Jan. 20, 2022

(30) Foreign Application Priority Data
Nov. 1, 2018 (CN) .......................... 201811296892.9

(51) Int. Cl.
*A47L 11/40* (2006.01)
*A47L 11/24* (2006.01)
*G05D 1/00* (2024.01)

(52) U.S. Cl.
CPC .......... *A47L 11/4011* (2013.01); *A47L 11/24* (2013.01); *A47L 11/4061* (2013.01); *G05D 1/0219* (2013.01); *A47L 2201/04* (2013.01)

(58) Field of Classification Search
CPC .. A47L 11/24; A47L 11/4008; A47L 11/4011; A47L 11/4061; A47L 2201/04; A47L 9/2826; A47L 9/2852; G05D 1/0219
See application file for complete search history.

(56) References Cited

U.S. PATENT DOCUMENTS

2004/0181896 A1   9/2004   Egawa et al.
2011/0226282 A1   9/2011   Choi et al.

FOREIGN PATENT DOCUMENTS

CN         1799489 A       7/2006
CN       105137992 A      12/2015
(Continued)

OTHER PUBLICATIONS

CN106527423 machine translation (Year: 2017).*
(Continued)

*Primary Examiner* — Douglas Lee
(74) *Attorney, Agent, or Firm* — Samson G. Yu

(57) ABSTRACT

A method and system for path sweeping of a cleaning robot, and a chip are disclosed. The method includes: detecting, in real time, a collision state of the cleaning robot in a turning process during S-shaped sweeping in a current cleaning area; and then controlling an 弓-shaped path of the cleaning robot according to the collision state, so that the cleaning robot achieves sweeping an area between an arc-shaped edge corresponding to a turning part of the 弓-shaped path, and a corner of the current cleaning area.

13 Claims, 3 Drawing Sheets

(56) References Cited

FOREIGN PATENT DOCUMENTS

| CN | 106419720 | A |   | 2/2017  |            |
|----|-----------|---|---|---------|------------|
| CN | 106527423 | A | * | 3/2017  |            |
| CN | 106527423 | A |   | 3/2017  |            |
| CN | 106821157 | A |   | 6/2017  |            |
| CN | 107102643 | A |   | 8/2017  |            |
| CN | 107328419 | A |   | 11/2017 |            |
| CN | 107491069 | A | * | 12/2017 | ...... A47L 11/24 |
| CN | 107491069 | A |   | 12/2017 |            |
| CN | 108113583 | A |   | 6/2018  |            |
| CN | 109276191 | A |   | 1/2019  |            |
| JP | H05324060 | A |   | 12/1993 |            |
| JP | H09198138 | A |   | 7/1997  |            |
| JP | H09269810 | A |   | 10/1997 |            |
| JP | 10-105237 | A |   | 4/1998  |            |
| JP | 2018075192| A |   | 5/2018  |            |

OTHER PUBLICATIONS

CN107491069 machine translation (Year: 2017).*
The second office action of family patent JP application No. 2021-523594 issued on Dec. 20, 2022.
The second office action of family patent AU application No. 2019372250 issued on Nov. 22, 2022.
The first office action of family patent JP application issued on Jul. 4, 2022.

* cited by examiner

METHOD AND SYSTEM FOR PATH SWEEPING OF CLEANING ROBOT, AND CHIP

CROSS-REFERENCE TO RELATED APPLICATIONS

The present disclosure takes the Chinese Patent Application No. 201811296892.9, filed on Nov. 11, 2018, and entitled "method and system for path sweeping of cleaning robot, and chip", as the priority, the entire contents of which are incorporated herein by reference.

TECHNICAL FIELD

The disclosure belongs to the field of intelligent household electrical appliances, and particularly relates to a sweeping-missing-proof path sweeping method and path sweeping system of a cleaning robot based on an 弓-shaped path and a chip.

BACKGROUND

Robots for cleaning have gradually become a household appliance often used in ordinary households. The sweeping rate and cleaning efficiency are what everyone is concerned about. In applications of the conventional art, a programmed cleaning robot generally adopts an S-shaped sweeping mode. First, the cleaning robot walks in a straight line. When encountering an obstacle, it moves to the next sweeping path by turning in an arc. This sweeping path is graceful and efficient, and is used in many applications.

However, there are two problems with the above-mentioned path planning mode. One of the problems is that, as illustrated in FIG. 1, when moving to a wall 101 according to a path 102, the cleaning robot collides with the wall before completing an arc-shaped turn, and cannot move to a next sweeping path according to an 弓-shaped path; Optionally, as shown in path 103, when approaching a wall 105, the cleaning robot collides with an obstacle 104 before completing an arc-shaped turn. Regarding the preceding paths 102 and 103, in the conventional art, in view of the above-mentioned situations, the cleaning robot directly walks along an edge; the cleaning robot on the path 102 walks against the wall 105 along an edge, the cleaning robot on the path 103 walks against the obstacle 104 along an edge, which can cause a sweeping missing area at a right-angle boundary between the wall 101 and the wall 105, or between the obstacle and a wall boundary.

The other problem is that, as illustrated in FIG. 2, there is a small exit 203 in a current cleaning area #1, the cleaning robot may collide with a wall 201 on one side of the exit 203 when making an arc-shaped turn along a path 202; in such case, a conventional processing method is to allow the cleaning robot to walk against the wall 201 along an edge; however, the exit 203 actually occupies a small cleaning area, which may occupy a small area in a grid map, and thus, after searching the exit 203, the cleaning robot walks against the wall 201 along an edge instead of sweeping an area within a preset range of the exit 203 and a wall 205, thereby resulting in forming of a sweeping missing area.

SUMMARY

A method for path sweeping of a cleaning robot is disclosed. The method includes: Step 1, detecting, in real time, a collision state of the cleaning robot in a turning process during S-shaped sweeping in a current cleaning area; and Step 2, controlling an 弓-shaped path of the cleaning robot according to the collision state, so that the cleaning robot achieves sweeping an area between an arc-shaped edge corresponding to a turning part of the 弓-shaped path, and a corner of the current cleaning area.

Optionally, Step 2 specifically includes: Step 21, when it is detected that the cleaning robot collides in the turning process of the S-shaped sweeping path, controlling the cleaning robot to move a first preset distance in a direction opposite to a current forward direction and then rotate in a direction against a turning direction of the turning process, so that a preset forward direction of the cleaning robot after rotating points to an arc-shaped outer side corresponding to the turning part of the 弓-shaped path, and then entering Step 23; Step 22, when it is detected that the cleaning robot does not collide in the turning process of the S-shaped sweeping path, continuing to sweep according to the 弓-shaped path; Step 23, controlling the cleaning robot to move along the preset forward direction, and detecting, in real time, whether a moving distance, in the preset forward direction, of the cleaning robot reaches a second preset distance or not, if YES, returning to Step 21, otherwise, entering Step 24; Step 24, detecting, in real time, whether a collision occurs or not, if YES, then entering Step 25, otherwise, returning to Step 23; and Step 25, controlling the cleaning robot to start to walk along an edge; where the first preset distance is configured to be less than or equal to a sweeping width of the cleaning robot, and the second preset distance is configured to be twice a sweeping row spacing of the S-shaped sweeping path.

Optionally, the preset forward direction is a direction at a preset angle to a straight path of the 弓-shaped path.

Optionally, in the current cleaning area, when the outer side of an arc-shaped edge, corresponding to the turning part of the 弓-shaped path in Step 21, has a small exit, the preset angle is configured to be 45 degrees.

A system for path sweeping of the cleaning robot is disclosed. The system includes: a collision detection unit, configured to detect, in real time, a collision state of the cleaning robot in a turning process during S-shaped sweeping in a current cleaning area; and a sweeping-missing-proof unit, configured to control an S-shaped sweeping path of the cleaning robot according to the collision state, so that the cleaning robot achieves sweeping a sweeping missing area between an arc-shaped edge corresponding to a turning part of the 弓-shaped path, and a corner of the current cleaning area.

Optionally, the sweeping-missing-proof unit internally includes: a first collision execution subunit, configured to, when it is detected that the cleaning robot collides in the turning process of the S-shaped sweeping path, control the cleaning robot to move along a first preset distance in a direction opposite to a current forward direction and then rotate in a direction against a turning direction in the turning process, so that a preset forward direction of the cleaning robot after rotating points to an arc-shaped outer side corresponding to the turning part of the 弓-shaped path; a second collision execution subunit, configured to control the cleaning robot to move a second preset distance along the preset forward direction, and detect, in real time, whether a moving distance reaches a second preset distance in the preset forward direction or not, if yes, then performing new S-shaped sweeping, otherwise, by real-time direction, control the cleaning robot to start to walk along an edge or continue to move along the preset forward direction; and a third collision execution subunit configured to, when it is detected that the cleaning robot does not collide in the turning process of the S-shaped sweeping path, control the cleaning robot to sweep according to the 弓-shaped path. The first preset distance is configured to be equal to a sweeping width of the cleaning robot, and the second preset distance is configured to be twice a sweeping row spacing of the 弓-shaped path.

Optionally, the preset forward direction is a direction at a preset angle to a straight path of the 弓-shaped path.

A chip is disclosed. The chip stores program codes corresponding to the method. The chip is built in the system, and is configured to control a cleaning robot to control an 弓-shaped path according to the collision state, so that the cleaning robot achieves sweeping a sweeping missing area between an arc-shaped edge corresponding to a turning part of the 弓-shaped path, and a corner of the current cleaning area.

DETAILED DESCRIPTION OF THE EMBODIMENTS

The technical solutions in the embodiments of the disclosure will be described below in combination with the drawings in the embodiments of the disclosure.

The embodiments of the disclosure provide A method for path sweeping of a cleaning robot. The essential concept of the method includes: Step 1, detecting, in real time, a collision state of the cleaning robot in a turning process during S-shaped sweeping in a current cleaning area; and Step 2, controlling an 弓-shaped path of the cleaning robot according to the collision state, so that the cleaning robot achieves sweeping an area between an arc-shaped edge corresponding to a turning part of the 弓-shaped path, and a corner of the current cleaning area. According to the embodiments of the disclosure, by using the an action control mode which adjusts a turning angle of the 弓-shaped path in combination with of sweeping along an edge, obstruction to S-shaped sweeping from an obstacle and walls is overcome, thereby increasing a sweeping coverage rate and a wall corner cleaning rate of the robot.

It is to be noted that, an execution body of the method provided by the embodiments of the disclosure is a controller. The controller is configured to control walking of the cleaning robot, in some embodiments, the controller is arranged on the cleaning robot to serve as a control device thereof, in some other embodiments, the controller is arranged out of the cleaning robot to control walking of the cleaning robot by means of remote control, and in some embodiments, the controller is other component having a similar function, which is not limited in the implementation mode. In the embodiments of the disclosure, the turning angle of the cleaning robot on the 弓-shaped path can be obtained through an angle in Y-axis of a three-axis gyroscope, and can also be obtained by other sensors, which is not limited in the implantation mode.

Figure 6:
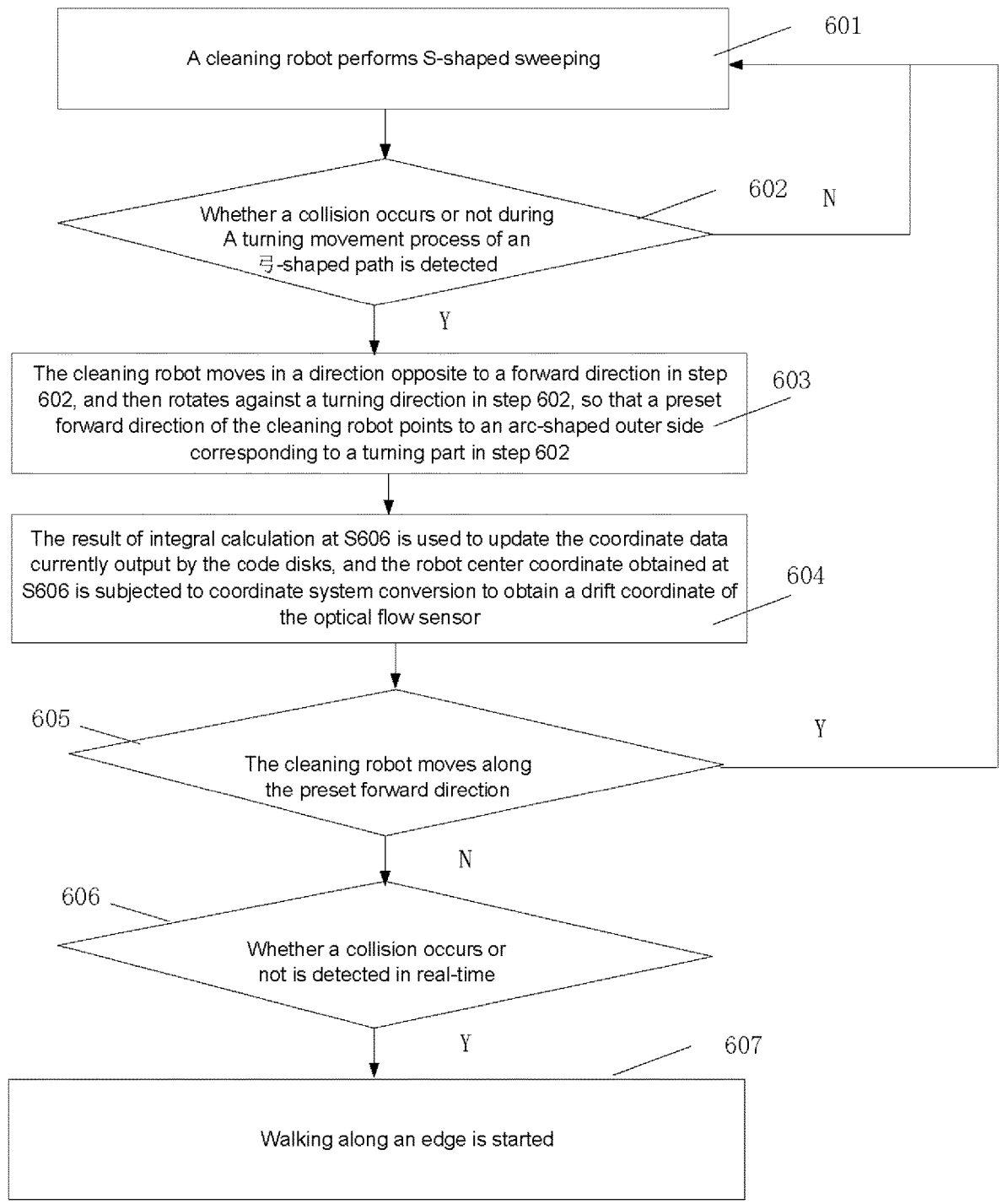
FIG. 6 is a flowchart of a method for path sweeping of a cleaning robot provided by an embodiment of the disclosure.

FIG. 6 is a flowchart of A method for path sweeping of a cleaning robot provided by an embodiment of the disclosure. Referring to FIG. 6, the method includes the following steps.

Figure 1:
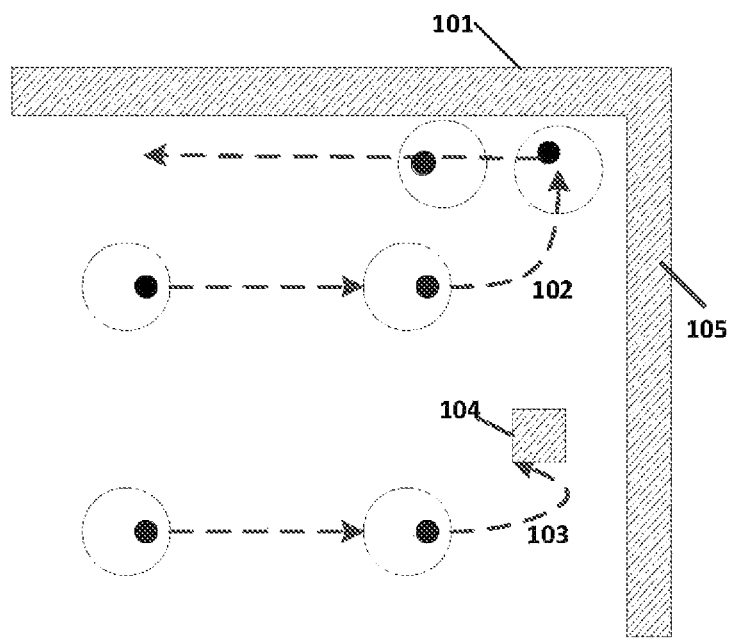
FIG. 1 is a schematic diagram of an S-shaped sweeping path (a path 102 in FIG. 1), around a wall, of a cleaning robot, and a schematic diagram of an S-shaped sweeping path (a path 103 in FIG. 1), around an obstacle, of the cleaning robot, in the conventional art.
Figure 2:
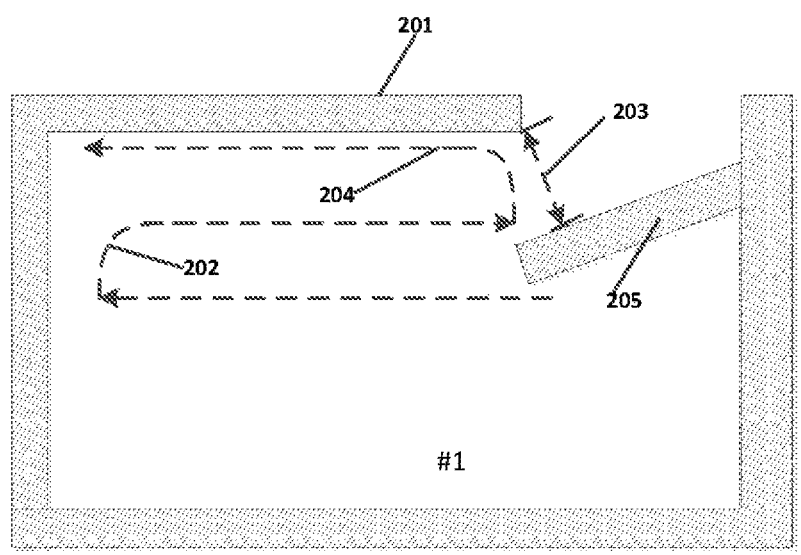
FIG. 2 is a schematic diagram of an S-shaped sweeping path, in a cleaning area #1, of the cleaning robot in the conventional art.

In Step 601, the cleaning robot is controlled to sweep along an 弓-shaped path in a current cleaning area, and then Step 602 is executed, as shown in FIG. 2, the 弓-shaped path includes multiple parallel straight paths 204 and multiple turning parts 202, the turning part (202) connected between any two adjacent straight paths 204.

In Step 602, in a turning movement process of the cleaning robot on the 弓-shaped path, whether a collision occurs or not is detected by related sensors, if a collision occurs, Step 603 is executed, if a collision does not occur, Step 601 is executed again. The collision refers to that the cleaning robot touches or approaches an obstacle in the current cleaning area. In some embodiments, the obstacle is a wall body, or other obstacles, which is not limited in the embodiments.

In Step 603, the cleaning robot moves a first preset distance in a direction opposite to a current forward direction in Step 602 and then rotates in a direction against a turning direction of the 弓-shaped path in Step 602, so that a preset forward direction of the cleaning robot after rotating points to the outer side of an arc-shaped edge corresponding to a turning part of the 弓-shaped path in Step 602, and then Step 604 is executed. Specifically, the preset forward direction is a direction at a preset angle to a straight path of the 弓-shaped path. In some embodiments, the first preset distance is a sweeping width of the cleaning robot. Compared with the conventional art, the steps are conductive to completing sweeping of a corner of the current cleaning area and an area of an arc-shaped outer side corresponding to the turning part of the S-shaped sweeping path. The method can control a sweeping range covering a wall corner area or a small area in a grid map.

In Step 604, the cleaning robot is controlled to move along the preset forward direction, and Step 605 is executed.

In Step 605, whether a moving distance, in the preset forward direction, of the cleaning robot reaches a second preset distance or not is detected in real time, if YES, Step 601 is executed again so that the cleaning robot is controlled to perform new S-shaped sweeping, otherwise, Step 606 is executed. The cleaning robot is not obstructed in a process of moving the second preset distance, and can sweep according to the 弓-shaped path, which also means that the cleaning robot smoothly passes through the small exit of the current cleaning area. It is to be noted that the small exit may be ignored by the robot in the grid map under the conventional technical means, so that the cleaning robot will not sweep the areas near the small exit even after searching. Specifically, in some embodiments, the second preset distance is configured to be twice a sweeping row space of the 弓-shaped path, so that the cleaning robot further determines whether a new 弓-shaped path can be performed when reaching a wall on opposite or reaching a fixed distance.

In Step 606, whether the cleaning robot is in collision or not is detected by related sensors in real time, if the cleaning robot is in collision, then Step 607 is executed, otherwise, Step 604 is executed. The cleaning robot continues to move in the preset forward direction until a moving distance of the cleaning robot in the preset forward direction reaches the second preset distance.

In Step 607, the cleaning robot is controlled to walk along an edge, around an obstacle that collides with it, to sweep an area surrounding the obstacle until leaving the obstacle, and then return to an identified normal area to perform S-shaped sweeping again.

Based on the above sweeping method, the sweeping path embodiments of the cleaning robot can be divided correspondingly to three different cleaning areas. In the three embodiments described below, a coverage rate and a wall corner cleaning rate of the robot are increased by controlling a turning angle, at a corner position, of the robot, which is helpful for the cleaning robot to overcome obstruction in turning during S-shaped sweeping, to smoothly enter a next straight path, while avoiding the problem that the 弓-shaped path is invalid when the cleaning robot collides with an obstacle.

Figure 3:
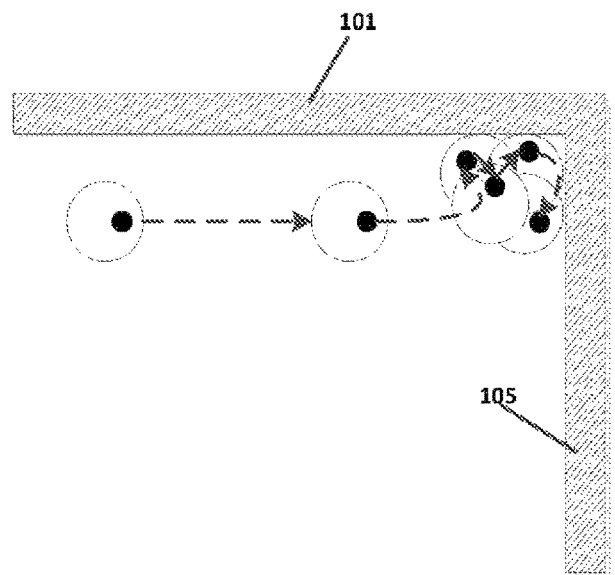
FIG. 3 is a schematic diagram of a sweeping-missing-proof path after a cleaning robot collides with a wall, in embodiment 1.

Embodiment 1: in FIG. 3, there is a right-angle wall corner in a current cleaning area; when the cleaning robot (as illustrated as a circle with a black dot in FIG. 3) approaches a corner area formed by a wall 101 and a wall 105 along a straight path of an 弓-shaped path, the cleaning robot begins to turn to enter a next straight path; however, it is detected that the cleaning robot collides with the wall 101 during turning, in such case, an arc-shaped turn in the 弓-shaped path has not been completed, and the cleaning robot moves along an arrowed dotted path in FIG. 3. A planning of the arrowed dotted path in FIG. 3 includes: the cleaning robot moves the first preset distance in a direction opposite to a current forward direction and then rotates in a direction against a turning direction of the turning process, so that a preset forward direction of the cleaning robot after rotating points to an arc-shaped outer side corresponding to a turning part of the 弓-shaped path; specifically, the cleaning robot faces a foot of a perpendicular formed by the wall 101 and the wall 105, and a direction at a present angle to a straight path of the 弓-shaped path. The cleaning robot is then controlled to move along the preset forward direction, and can achieve cleaning of a wall corner of the current cleaning area and an area of the arc-shaped outer side corresponding to the turning part of the S-shaped sweeping path during moving. In the embodiment illustrated in FIG. 3, in a process that the cleaning robot moves the second preset distance along the preset advance direction, it is detected that the cleaning robot collides with the wall 105, the cleaning robot stops moving in the preset advance direction, moves against the wall 105 along an edge, and enters a new 弓-shaped path for sweeping.

Figure 4:
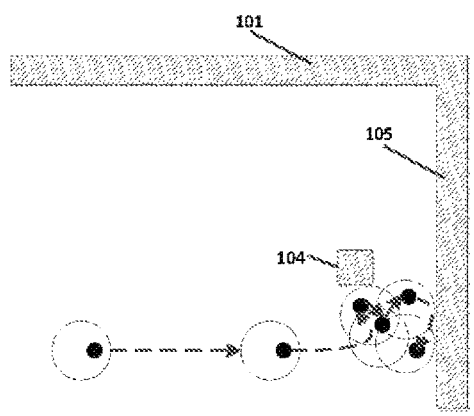
FIG. 4 is a schematic diagram of a sweeping-missing-proof path after a cleaning robot collides with an obstacle 104, in embodiment 2.

Embodiment 2: in FIG. 4, there are a right-angle wall corner and an isolated obstacle 104 in a current cleaning area; when the cleaning robot (as illustrated as a circle with a black dot in FIG. 4) approaches the obstacle 104 along a straight path of an 弓-shaped path, the cleaning robot begins to turn to enter a next straight path; it is detected that the cleaning robot collides with the obstacle 104 during turning, in such case, an arc-shaped turn in the 弓-shaped path has not been completed, and the cleaning robot moves along an arrowed dotted path in FIG. 4. A planning of the arrowed dotted path in FIG. 4 includes: the cleaning robot moves the first preset distance in a direction opposite to a current forward direction, and then rotates in a direction against a turning direction in the turning process, so that a preset forward direction of the cleaning robot after rotating points to an arc-shaped outer side corresponding to the turning part of the S-shaped sweeping path, and a direction at a preset angle to a straight path of the 弓-shaped path; specifically, the cleaning robot faces an area between the obstacle 104 and the wall 105 instead of leaving the wall 105 by walking against the obstacle 104 along an edge, so that the area between the obstacle 104 and the wall 105 may not be a sweeping missing area. The cleaning robot is then controlled to move along the preset forward direction, and can achieve cleaning of the wall 105 and the area of the arc-shaped outer side corresponding to the turning part of the S-shaped sweeping path during moving. In the embodiment illustrated in FIG. 4, in a process that the cleaning robot moves the second preset distance along the preset advance direction, it is detected that the cleaning robot collides with the wall 105, the cleaning robot stops moving in the preset advance direction, moves against the wall 105 along an edge, and enters a new 弓-shaped path for sweeping.

Figure 5:
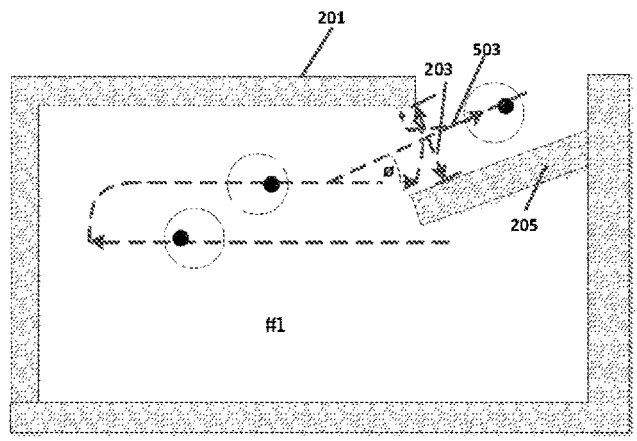
FIG. 5 is a schematic diagram of a path, turning out of a small exit of a cleaning area #1, of a cleaning robot in embodiment 3.

Embodiment 3: in FIG. 5, there is a small exit 203, in a direction 503, in a cleaning area #1, and a wall 201 and a wall 205 are respectively disposed at two ends of the exit; when the cleaning robot (as illustrated as a circle with a black dot in FIG. 5) approaches the small exit 203 in the direction 503 along an 弓-shaped path, the cleaning robots begins to turn to enter a next straight path; it is detected that the cleaning robot collides with the wall 201 during turning, in such case, an arc-shaped turn of the 弓-shaped path has not been completed, and the cleaning robot moves along an arrowed dotted path in FIG. 5. A planning of the arrowed dotted path in FIG. 5 includes: the cleaning robot moves a first preset distance in a direction opposite to a current forward direction, and then rotates in a direction against a turning direction in the turning process, so that a preset forward direction of the cleaning robot after rotating points to an arc-shaped outer side corresponding to a turning part of the S-shaped sweeping path, and a direction at a preset angle to a straight path, before turning, of the 弓-shaped path, where the preset angle is configured to be 45 degrees in some embodiments. Specifically, the cleaning robot faces the direction 503 instead of leaving the small exit 203 by walking against the wall 201 along an edge, so that an area in a preset range of the small exit 203 in the direction 503 is avoided being a sweeping missing area. The cleaning robot is then controlled to move along the preset forward direction, and can achieve cleaning of the arc-shaped outer side area corresponding to the turning part of the 弓-shaped path during moving, that is, can complete cleaning of the area within the preset range of the small exit 203 in the direction 503. When a moving distance of the cleaning robot in the preset forward direction reaches the second preset distance and no collision is detected, as illustrated in FIG. 5, the cleaning robot passes through the small exit 203 in the direction 503 and satisfies conditions of the 弓-shaped path, so that the cleaning robot can perform new S-shaped sweeping, to maintain continuous sweeping on the 弓-shaped path. When the moving distance of the cleaning robot in the preset forward direction does not reaches the second preset distance and no collision is detected, the cleaning robot continues to move in the preset forward direction, while the moving distance of the cleaning robot in the preset forward direction is detected in real time, so that the cleaning robot can continue to sweep the area within the preset range of the small exit 203 in the direction 503. When the moving distance of the cleaning robot in the preset forward direction does not reach the second preset distance and a collision between the cleaning robot and the wall 205 is detected, the cleaning robot sweeps against the wall 205 along an edge, to continue to sweep the area within the preset range of the small exit 203 in the direction 503.

In the above embodiments, the first preset distance can be configured to be equal to a sweeping width of the cleaning robot, and the second preset distance is configured to be twice a sweeping row spacing of the 弓-shaped path. In Embodiment 3, the present angle can be configured to be 45 degrees.

For the above embodiments, for simple description, each embodiment is expressed into a combination of a series of actions. However, those skilled in the art should know that the implementation modes of the disclosure are not limited by an action sequence described herein because some steps may be executed in another sequence or at the same time according to the implementation modes of the disclosure. Second, those skilled in the art should also know that the implementation modes described in the specification all belong to preferred implementation modes, and involved actions are not always necessary to the implementation modes of the disclosure.

The embodiments of the disclosure further provide a system for path sweeping of the cleaning robot, including: a collision detection unit configured to detect, in real time, a collision state of the cleaning robot in a turning process during S-shaped sweeping in a current cleaning area; and a sweeping-missing-proof unit configured to control an S-shaped sweeping path of the cleaning robot according to the collision state, so that the cleaning robot achieves sweeping a sweeping missing area between an arc-shaped edge corresponding to a turning part of the 弓-shaped path, and a corner of the current cleaning area.

In an alternative embodiment of the disclosure, the sweeping-missing-proof internally includes the following units.

A first collision execution subunit is configured to, when it is detected that the cleaning robot collides in the turning process of the S-shaped sweeping path, control the cleaning robot to move along a first preset distance in a direction opposite to a current forward direction, and then rotate in a direction against a turning direction in the turning process, so that a preset forward direction of the cleaning robot after rotating points to a direction of an arc-shaped outer side corresponding to a turning part of the S-shaped sweeping path; a second collision execution subunit is configured to control the cleaning robot to move, and detect, in real time, a collision state, in a process of moving a second preset distance, of the cleaning robot, and control to start the cleaning robot to walk along an edge when a collision occurs, otherwise, continue to sweep according to an 弓-shaped path; and a third collision execution subunit is configured to, when it is detected that the cleaning robot does not collide in the turning process of the S-shaped sweeping path, control the cleaning robot to sweep according to the 弓-shaped path.

In an alternative embodiment of the disclosure, a calling module is further included. In the system, the calling module calls the first collision execution subunit, the second collision execution subunit, and the third collision execution subunit correspondingly according to a judgment result of the collision detection unit and a moving distance of the cleaning robot in the preset forward direction.

In an alternative embodiment of the disclosure, the preset forward direction is a direction at a preset angle to a corresponding straight path before turning in S-shaped sweeping.

The system further includes: a gyroscope, a code disc, and left and right wheels of the cleaning robot. The gyroscope is configured to collect a yaw angle of the cleaning robot, and send the collected yaw angle to the system. The code disc is configured to collect a moving distance of the cleaning robot in the preset forward direction, and send the moving distance to the second collision execution subunit, to be compared with the second preset distance. The left and right wheels of the cleaning robot are configured to receive control instructions of the system to control a turning direction of the cleaning robot.

The embodiments of the disclosure provide a chip. The chip stores program codes corresponding to the method. The chip is built in the system, and is configured to control the cleaning robot to control an 弓-shaped path thereof according to the collision state so that the cleaning robot achieves sweeping a sweeping missing area between an arc-shaped edge corresponding to a turning part of the 弓-shaped path, and a corner of the current cleaning area.

The last thing to be noted is: the above embodiments are only used to illustrate the technical solutions of the disclosure and not to limit them; although the disclosure has been described in detail with reference to the preferred embodiments, those of ordinary skill in the art should understand that modifications to the specific implementation modes of the disclosure or equivalent replacements to part of technical features can still be made, without departing from the spirit of the technical solutions of the disclosure, and all of the modifications and replacements shall be covered in the scope of the technical solutions claimed by the disclosure.

What is claimed is:

1. A method for path sweeping of a cleaning robot, wherein the method comprises:
   Step 1: detecting, in real time, a collision state of the cleaning robot in a turning process during S-shaped sweeping in a current cleaning area; and
   Step 2: controlling an 弓-shaped path of the cleaning robot according to the collision state, so that the cleaning robot achieves sweeping an area between an arc-shaped edge corresponding to a turning part of the 弓-shaped path, and a corner of the current cleaning area.

2. The method according to claim 1, wherein Step 2 specifically comprises:
   Step 21, when it is detected that the cleaning robot collides in the turning process of the S-shaped sweeping path, controlling the cleaning robot to move a first preset distance in a direction opposite to a current forward direction, and then rotate in a direction against a turning direction of the turning process, so that a preset forward direction of the cleaning robot after rotating points to an arc-shaped outer side corresponding to the turning part of the 弓-shaped path, and then entering Step 23;
   Step 22, when it is detected that the cleaning robot does not collide in the turning process of the S-shaped sweeping path, continuing to sweep according to the 弓-shaped path;
   Step 23, controlling the cleaning robot to move along the preset forward direction, and detecting, in real time, whether a moving distance, in the preset forward direction, of the cleaning robot reaches a second preset distance or not, if yes, returning to Step 21, otherwise, entering Step 24;
   Step 24, detecting, in real time, whether a collision occurs or not, if YES, then entering Step 25, otherwise, returning to Step 23; and
   Step 25, controlling the cleaning robot to start to walk along an edge;

wherein the first preset distance is configured to be less than or equal to a sweeping width of the cleaning robot, and the second preset distance is configured to be twice a sweeping row spacing of the 弓-shaped path.

3. The method according to claim 2, wherein the preset forward direction is a direction at a preset angle to a straight path of the 弓-shaped path.

4. The method according to claim 3, wherein in the current cleaning area, when the arc-shaped edge, corresponding to the turning part of the 弓-shaped path in Step 21, has a small exit, the preset angle is configured to be 45 degrees.

5. A system for path sweeping of a cleaning robot, wherein the system comprises:
   a collision detection unit, configured to detect, in real time, a collision state of the cleaning robot in a turning process during S-shaped sweeping in a current cleaning area; and
   a sweeping-missing-proof unit, configured to control an S-shaped sweeping path of the cleaning robot according to the collision state, so that the cleaning robot achieves sweeping an area between an arc-shaped edge corresponding to a turning part of the 弓-shaped path, and a corner of the current cleaning area.

6. The system according to claim 5, wherein the sweeping-missing-proof unit comprises:
   a first collision execution subunit, configured to, when it is detected that the cleaning robot collides in the turning process of the S-shaped sweeping path, control the cleaning robot to move a first preset distance in a direction opposite to a current forward direction, and then rotate in a direction against a turning direction in the turning process, so that a preset forward direction of the cleaning robot after rotating points to a direction of an arc-shaped outer side corresponding to the turning part of the 弓-shaped path;
   a second collision execution subunit, configured to control the cleaning robot to move a second preset distance along the preset forward direction, and detect, in real time, whether a moving distance reaches a second preset distance in the preset forward direction or not, if yes, then performing new S-shaped sweeping, otherwise, by real-time direction, control the cleaning robot to walk along an edge or continue to move along the preset forward direction; and
   a third collision execution subunit, configured to, when it is detected that the cleaning robot does not collide in the turning process of the S-shaped sweeping path, control the cleaning robot to sweep according to the 弓-shaped path;
   wherein the first preset distance is configured to be less than or equal to a sweeping width of the cleaning robot, and the second preset distance is configured to be twice a sweeping row spacing of the 弓-shaped path.

7. The system according to claim 6, wherein the preset forward direction is a direction at a preset angle to a straight path of the 弓-shaped path.

8. A chip, wherein the chip stores program codes corresponding to a method for path sweeping of a cleaning robot, the method comprises:
   Step 1: detecting, in real time, a collision state of the cleaning robot in a turning process during S-shaped sweeping in a current cleaning area; and
   Step 2: controlling an 弓-shaped path of the cleaning robot according to the collision state, so that the cleaning robot achieves sweeping an area between an arc-shaped edge corresponding to a turning part of the 弓-shaped path, and a corner of the current cleaning area,
   the chip is built in a system for path sweeping of a cleaning robot, the system comprises:
   a collision detection unit, configured to detect, in real time, a collision state of the cleaning robot in a turning process during S-shaped sweeping in a current cleaning area; and
   a sweeping-missing-proof unit, configured to control an S-shaped sweeping path of the cleaning robot according to the collision state, so that the cleaning robot achieves sweeping an area between an arc-shaped edge corresponding to a turning part of the 弓-shaped path, and a corner of the current cleaning area,
   the chip is configured to control a cleaning robot to control an 弓-shaped path according to the collision state, so that the cleaning robot achieves sweeping a sweeping missing area between an arc-shaped edge corresponding to a turning part of the 弓-shaped path, and a corner of the current cleaning area.

9. The chip according to claim 8, wherein Step 2 specifically comprises:
   Step 21, when it is detected that the cleaning robot collides in the turning process of the S-shaped sweeping path, controlling the cleaning robot to move a first preset distance in a direction opposite to a current forward direction, and then rotate in a direction against a turning direction of the turning process, so that a preset forward direction of the cleaning robot after rotating points to an arc-shaped outer side corresponding to the turning part of the 弓-shaped path, and then entering Step 23;
   Step 22, when it is detected that the cleaning robot does not collide in the turning process of the S-shaped sweeping path, continuing to sweep according to the 弓-shaped path;
   Step 23, controlling the cleaning robot to move along the preset forward direction, and detecting, in real time, whether a moving distance, in the preset forward direction, of the cleaning robot reaches a second preset distance or not, if yes, returning to Step 21, otherwise, entering Step 24;
   Step 24, detecting, in real time, whether a collision occurs or not, if YES, then entering Step 25, otherwise, returning to Step 23; and
   Step 25, controlling the cleaning robot to start to walk along an edge;
   wherein the first preset distance is configured to be less than or equal to a sweeping width of the cleaning robot, and the second preset distance is configured to be twice a sweeping row spacing of the 弓-shaped path.

10. The chip according to claim 9, wherein the preset forward direction is a direction at a preset angle to a straight path of the 弓-shaped path.

11. The chip according to claim 10, wherein in the current cleaning area, when the arc-shaped edge, corresponding to the turning part of the 弓-shaped path in Step 21, has a small exit, the preset angle is configured to be 45 degrees.

12. The chip according to claim 8, wherein the sweeping-missing-proof unit comprises:
   a first collision execution subunit, configured to, when it is detected that the cleaning robot collides in the turning process of the S-shaped sweeping path, control the cleaning robot to move a first preset distance in a direction opposite to a current forward direction, and then rotate in a direction against a turning direction in the turning process, so that a preset forward direction of the cleaning robot after rotating points to a direction of an arc-shaped outer side corresponding to the turning part of the 弓-shaped path;

a second collision execution subunit, configured to control the cleaning robot to move a second preset distance along the preset forward direction, and detect, in real time, whether a moving distance reaches a second preset distance in the preset forward direction or not, if yes, then performing new S-shaped sweeping, otherwise, by real-time direction, control the cleaning robot to walk along an edge or continue to move along the preset forward direction; and a third collision execution subunit, configured to, when it is detected that the cleaning robot does not collide in the turning process of the S-shaped sweeping path, control the cleaning robot to sweep according to the 弓-shaped path;

wherein the first preset distance is configured to be less than or equal to a sweeping width of the cleaning robot, and the second preset distance is configured to be twice a sweeping row spacing of the 弓-shaped path.

13. The chip according to claim 12, wherein the preset forward direction is a direction at a preset angle to a straight path of the 弓-shaped path.

* * * * *